June 17, 1952  R. J. LANNEN  2,600,888
BALANCE TESTING MACHINE
Filed Jan. 12, 1951  2 SHEETS—SHEET 1

*INVENTOR.*
ROBERT J. LANNEN
BY
*J. S. Murray*
ATTORNEY

June 17, 1952     R. J. LANNEN     2,600,888
BALANCE TESTING MACHINE

Filed Jan. 12, 1951     2 SHEETS—SHEET 2

INVENTOR.
ROBERT J. LANNEN
BY
ATTORNEY

Patented June 17, 1952

2,600,888

UNITED STATES PATENT OFFICE 2,600,888

BALANCE TESTING MACHINE

Robert J. Lannen, Detroit, Mich., assignor to Micro-Poise Engineering and Sales Company, Detroit, Mich., a partnership Application January 12, 1951, Serial No. 205,767

8 Claims. (Cl. 248—177)

This invention relates to balance testing machines and particularly to universal pivots for such machines. United States Patent 2,349,288 of May 23, 1944 discloses a balance testing machine employing a short length of vertically disposed flexible wire universally pivoting a load-receiving member on an upright pin. A pivot element of that type is not subject to material wear and is hence decidedly superior for testing purposes to ball-type pivots. The construction disclosed in said patent locates the wire substantially at the axis of said upright pin within a slot formed at such axis. One wall of the slot is cut through to accommodate an element transmitting load to the wire from a work piece requiring balance testing. It has been found that the wire-mounting upper end of the described pin tends to flex slightly under load due to weakness resulting from the aforementioned slots.

An object of the invention is to equip a balance testing machine with a universal pivot comprising a short length of wire, and to so suspend the wire from a support that load stresses transmitted to the support will be balanced with relation to the wire, avoiding any tendency toward lateral flexure of the support.

Another object is to provide a universal pivot comprising a length of wire disposed between a pair of spaced arms forming the upper portion of a pin, and to adapt the upper ends of such arms to clamp and carry such wire, the lower end of the wire being loaded by clamping such end between a pair of arms spaced transversely to the first-mentioned arms and transmitting a load from a member disposed above said pin.

Another object is to adapt each pair of the aforementioned arms to fit between those of the other pair, and to impart to said arms a cross section deriving maximum strength, and forming between adjoining arms narrow slots radial to said wire, affording a requisite play between the two pairs.

These and various other objects are attained by the construction hereinafter described and illustrated in the accompanying drawings, wherein.

Figure 1:
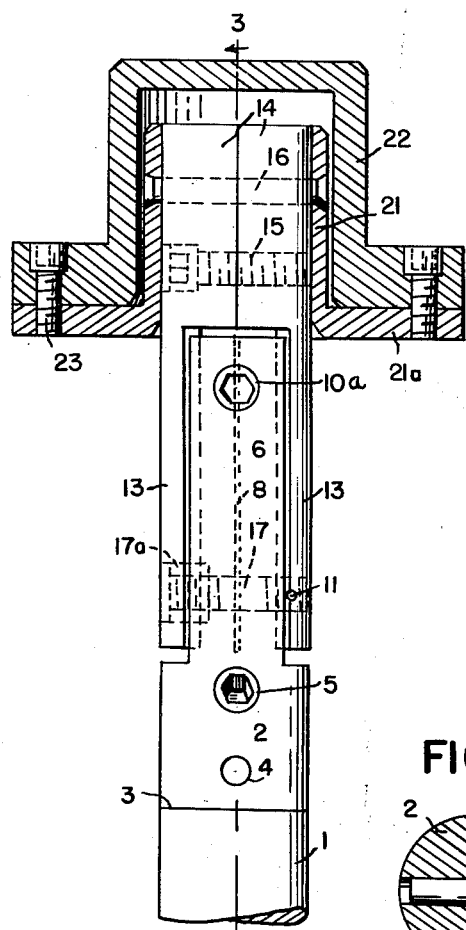
Figs. 1 and 2 are relatively transverse side elevational views of my improved universal pivot.
Figure 2:
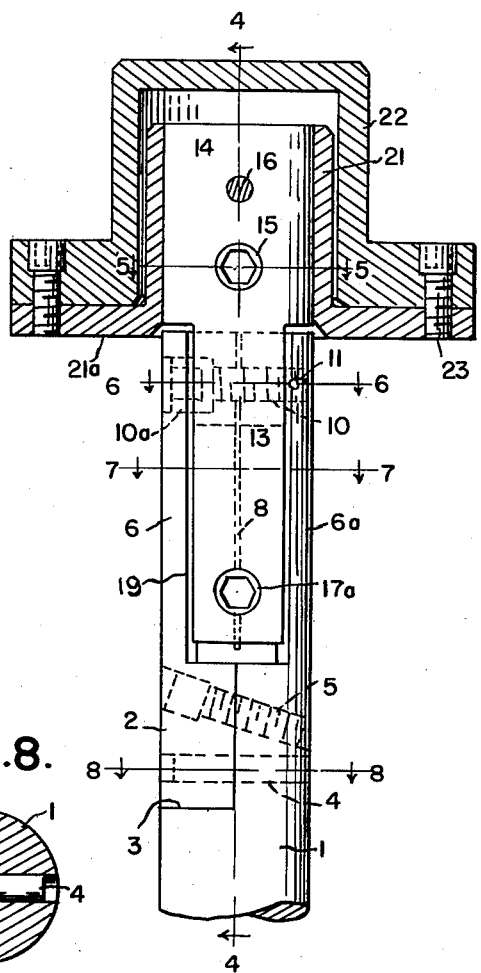
Figure 8:
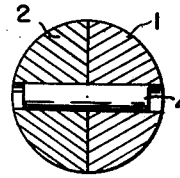
Figure 5:
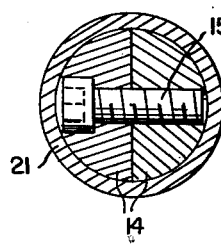
Figure 6:
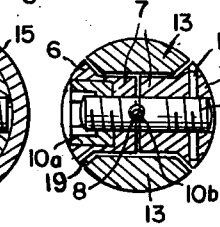
Figure 7:
Figures 3, 4:
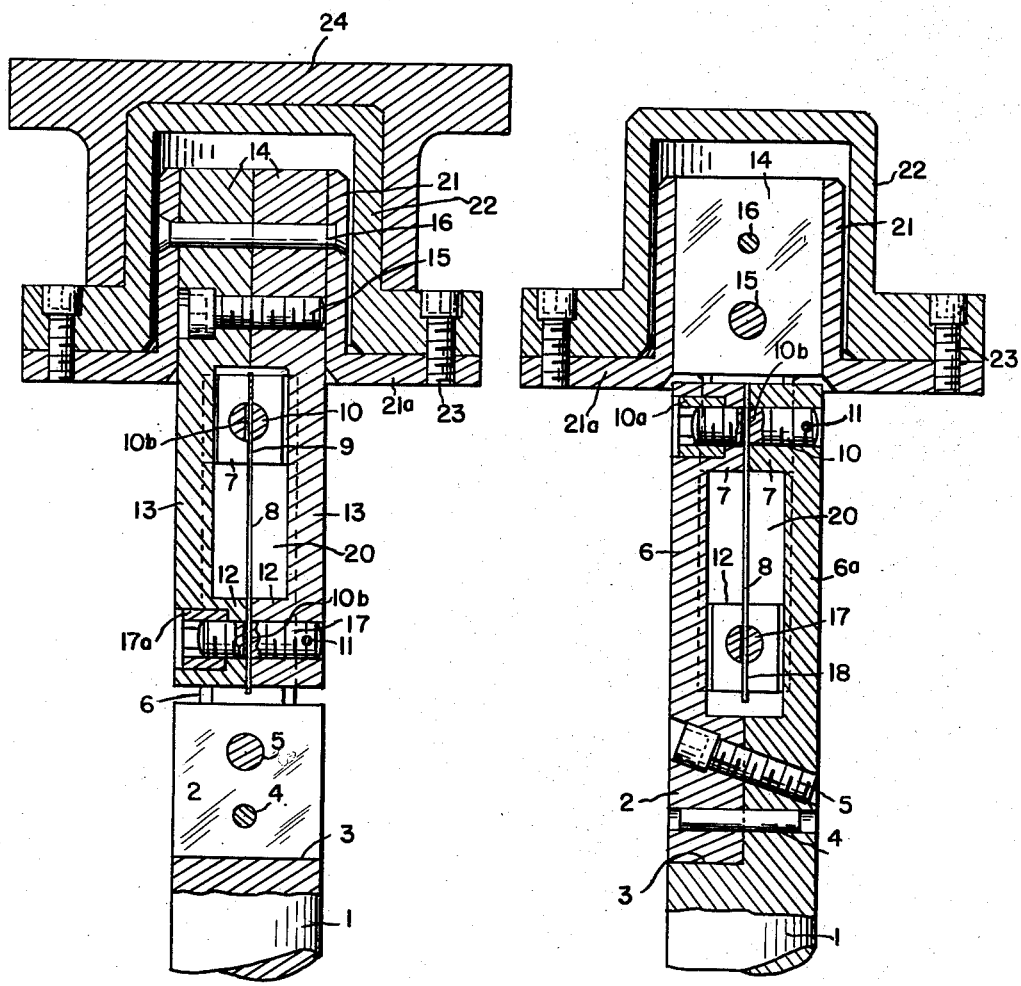
Fig. 3 is an axial vertical sectional view of the pivot taken on the line 3—3 of Fig. 1.
Fig. 4 is an axial vertical sectional view of the pivot taken on the line 4—4 of Fig. 2.

Figs. 5, 6, 7 and 8 are cross sectional views taken respectively on the lines 5—5, 6—6, 7—7 and 8—8 of Fig. 2.

In these views, the reference character 1 designates a cylindrical upright pin, supported in any desired manner, as for example as appears in said Patent 2,349,288. A vertically elongated upper section 2 is detachable from the main body of the pin, such section and the main body meeting diametrically of the pin and the section seating downwardly on a shoulder 3 of the main body. A dowel pin 4 and a headed screw 5 jointly secure the lower portion of the section 2 to the main body, the screw having a slight downward inclination toward its leading end to facilitate a firm seat of the section 2 on the shoulder 3. Above its anchored lower portion the section 2 is cut away to form an upwardly projecting arm 6 having the cross-sectional form of a truncated sector approximating ninety degrees, and the corresponding upper portion of the main body is cut away to form a duplicate arm 6a. The upper end portions of the described arms integrally carry a pair of duplicate rectangular clamping jaws 7 which are closely adjoined at the axis of the pin 1. Disposed at such axis is a short length of quite strong and at least slightly flexible wire 8, its upper portion being engaged between said jaws and retained in vertical grooves 9 of the jaws. The jaws are interconnected and firmly clamped on the wire by a bolt 10 and nut 10a, the latter being set into the section 2. Prior to stressing the bolt, the wire is passed freely through a diametrical passage 10b of the bolt, stress being applied by rotation of the nut. A dowel pin 11, inserted in the arm 6a, diametrically extends through the bolt and holds the latter from rotation.

The wire 8 has a free portion between the jaws 7 and a pair of jaws 12 clamped on the lower portion of the wire. Such free portion is of a length affording a desired slight flexure of the wire, such length depending primarily on the maximum load which the wire is designed to sustain. The jaws 12 duplicate the jaws 7 and are integrally formed on the lower end portions of a pair of arms 13, disposed in part between the arms 6 and 6a, duplicating the cross section of the latter, and integrally carried by the semi-cylindrical halves of a head 14 spaced slightly above the jaws 7. Said halves are rigidly interconnected in complementary relation by a headed screw 15 and a dowel pin 16. For clamping engagement with the wire, the jaws 12 are interconnected by a bolt 17 and nut 17a, the latter being recessed in one of the arms 13. Like the jaws 7, the jaws 12 are vertically grooved at 18 to accommodate the wire. It will be understood that the wire must establish a slight space interval between the jaws of each pair, so that clamping stresses applied to the jaws will be fully effective on the wire. The bolt 17 has a diametrical passage 10b freely accommodating the wire, and is doweled to one of the arms 13 at 11. The arms 13 are slightly spaced from the arms 6 and 6a by slots 19 substantially radial to the wire, the four arms jointly forming a vertically elongated substantially rectangular chamber 20 accommodating the free length of the wire.

Press-fitted on the head 14 is a collar 21 formed with an annular exterior flange 21a, the dowel pin 16 preferably serving to rivet said collar on the head. Enclosing said collar is an adapter holder 22 having an annular flange secured by screws 23 to the flange 21a. The holder 22 carries any desired adapter 24, fashioned to fit a certain piece of work (not shown) requiring balance testing, and accurately centering such piece at the pin axis.

The load formed by any work piece applied to the adapter 24 is transmitted through the head 14 and arms 13 to the wire 8, and the latter transmits the load to the pin 1 through the arms 6 and 6a. As thus transmitted, the load has no tendency to flex the pin and thus induce inaccuracy. Also by mounting the wire as above described, a balancing machine may be suited to considerably heavier work loads than have been heretofore feasible, in a machine of the same size.

What I claim is:

1. In a balance testing machine, the combination with a support including a pair of upwardly projecting, substantially parallel, spaced arms, of an upper pair of coacting clamping jaws fixed on the upper end portions of said arms, an elongated flexible pivot element clamped between and downwardly extending from said jaws, a lower pair of jaws clamped upon said pivot element in downwardly spaced relation to the upper pair of jaws, a load-receiving member, and a pair of substantially parallel arms downwardly projecting from said member and spaced apart transversely to the spacing of the upwardly projecting arms, and rigidly mounting the lower pair of jaws.

2. In a balance testing machine as set forth in claim 1, one of said upwardly projecting arms being integral with said support, means detachably mounting the companion arm on the support.

3. A balance testing machine as set forth in claim 1, the arms of each said pair being disposed at least partially between the arms of the other pair, and the two pairs of arms jointly forming a chamber wherein said pivot element extends between the upper and lower jaws.

4. In a balance testing machine as set forth in claim 1, an element interconnecting the jaws of each pair, and adjustable to impose a required clamping stress on such jaws.

5. A balance testing machine as set forth in claim 1, said load-receiving member being disposed above and spaced from said upper pair of clamping jaws.

6. In a balance testing machine, the combination with a vertically disposed cylindrical pin, comprising a pair of upwardly projecting arms spaced oppositely and substantially equally from the axis of the pin, an upper pair of coacting clamping jaws carried by the upper end portions of said arms, means for regulably applying a clamping stress to said jaws, an elongated flexible pivot element clamped between and downwardly extending from said jaws, substantially at the axis of said pin, a lower pair of jaws clamped upon said pivot element in downwardly spaced relation to the upper jaws, a load-receiving member disposed above the upper jaws and substantially coaxial with said pin, a pair of vertically elongated spaced arms downwardly extending from said member, and disposed at least partially between said upwardly projecting arms, and mounting the lower pair of jaws, and means for regulably applying a clamping stress to the lower jaws.

7. In a universally pivotal balance testing machine, the combination with a flexible pivot element, elongated substantially vertically, of a support for such element including a pair of upwardly projecting substantially parallel spaced arms, means for clamping the upper portion of the pivot element between the upper portions of said arms, a load-receiving member, a pair of load-transmitting arms downwardly projecting from said member and spaced apart transversely to the spacing of the upwardly projecting arms, and means for clamping the lower portion of the pivot element between the lower portions of the downwardly projecting arms, said element having a portion freely extending between its clamped upper and lower portions.

8. In a universally pivotal balance testing machine, the combination with a flexible pivot element, elongated substantially vertically, of a support for such element including a plurality of upwardly projecting substantially parallel spaced arms, means for clamping the upper portions of said arms upon the upper portion of the pivot element, a load-receiving member, a plurality of load-transmitting arms downwardly projecting from said member and disposed at least partially between the upwardly projecting arms, and means for clamping the lower portions of the downwardly projecting arms upon the lower portion of the pivot element, said element having a portion freely extending between its clamped upper and lower portions.

ROBERT J. LANNEN.

REFERENCES CITED

The following references are of record in the file of this patent:

UNITED STATES PATENTS

| Number | Name | Date |
|---|---|---|
| 912,927 | Winans | Feb. 16, 1909 |

FOREIGN PATENTS

| Number | Country | Date |
|---|---|---|
| 25,551 | Great Britain | of 1907 |